United States Patent [19]
Mori et al.

[11] Patent Number: 5,080,394
[45] Date of Patent: Jan. 14, 1992

[54] AIR BAG DEVICE

[75] Inventors: Shinji Mori; Teruhiko Kawaguchi, both of Aichi, Japan

[73] Assignee: Kabushiki Kaisha Tokai-Rika-Denki-Seisakusho, Niwa Aichi, Japan

[21] Appl. No.: 577,117

[22] Filed: Sep. 4, 1990

[30] Foreign Application Priority Data

Sep. 12, 1989 [JP] Japan .............................. 1-107076[U]

[51] Int. Cl.⁵ .............................................. B60R 21/32
[52] U.S. Cl. ..................................... 280/734; 280/731
[58] Field of Search ........................ 280/731, 732, 734

[56] References Cited

U.S. PATENT DOCUMENTS

| | | |
|---|---|---|
| 4,573,706 | 3/1986 | Breed .................................. 280/734 |
| 4,960,292 | 10/1990 | Sadler ................................. 280/731 |

FOREIGN PATENT DOCUMENTS

| | | |
|---|---|---|
| 60-248454 | 9/1985 | Japan ................................... 280/734 |
| 60-248455 | 9/1985 | Japan ................................... 280/734 |
| 60-248456 | 9/1985 | Japan ................................... 280/734 |
| 60-248457 | 9/1985 | Japan ................................... 280/734 |

Primary Examiner—Kenneth R. Rice
Attorney, Agent, or Firm—Sixbey, Friedman, Leedom & Ferguson

[57] ABSTRACT

An air bag body to be mounted on a vehicle has a built-in acceleration sensor. A restriction apparatus prevents the acceleration sensor from activating before the air bag body is fixed to a vehicle. After the air bag body is fixed to a vehicle, an operator screws a press member in, and the press body directly comes in contact with the restriction apparatus, rotates the restriction apparatus, and makes the acceleration sensor operational. As the press member directly comes in contact with and rotates the restriction apparatus, the pressing force is transmitted without fail.

19 Claims, 10 Drawing Sheets

5,080,394

AIR BAG DEVICE

BACKGROUND OF THE INVENTION

1. Field of the Invention

The present device relates to an air bag device in which an air bag inflates in front of and comes in contact with a person at the time of the sudden acceleration of a vehicle.

2. Background Information

An air bag device has been proposed which protects a person in a vehicle by an air bag being inflated in front of the person during the rapid deceleration of a vehicle (Japanese Patent Application Laid-Open Nos. 60-248454, 60-248455, 60-248456 and 60-248457).

With this air bag device, when there is rapid deceleration of a vehicle, a ball in an air bag activation device moves by being subjected to inertial force causing a drive shaft that is in contact with the ball to rotate. An igniting pin in engagement with the drive shaft is released and collides with a percussion cap which combusts a gas generating material thereby inflating the air bag.

A safety device is disposed in this kind of an air bag device so that an air bag does not inflate carelessly in case an impact is erroneously imparted to the air bag device when it is installed or removed. The safety device prevents the ball from moving via the drive shaft by preventing the drive shaft from rotating by bringing a lengthy portion of a coiled spring in contact with the drive shaft. The drive shaft is in contact with the ball.

The following is a description of the operation of releasing the safety device with reference to FIG. 10. First, a slide member 102 is pressed, and by pushing up a release pin 104 axially (in the direction of an arrow Y of FIG. 10), a lock shaft 106 is moved axially. Then, a lengthy portion 108A of a coiled spring 108 in contact with the bottom of a ring groove 106A formed in the lock shaft 106 is moved from the ring groove 106A to a peripheral portion 106B of the lock shaft 106 due to the axial movement of the lock shaft 106. By this, the lengthy portion 108A of the coiled spring 108 rotates counterclockwise in FIG. 10 (in the direction of an arrow X of FIG. 10) and withdraws from the locus of rotation of a drive shaft 110, and thus, a ball 100 becomes movable.

Due to this structure, the surface pressure between the lock shaft 106 and the coiled spring is high, which requires unconventional, anti-friction treatment such as oil lubrication or surface finishing, which further results in the high cost of manufacturing the product.

SUMMARY OF THE INVENTION

The object of the present invention is to provide a low-cost air bag device the components of which need no unconventional, anti-friction on treatment such as oil lubrication, surface finishing or the like, etc.

In the present invention, restriction means is provided which makes an acceleration sensor in an activation-blocked state, and before a body of an air bag is fixed to a body of a vehicle, the air bag is not inflated, even if an impact is imparted to the body of the air bag. After the body of the air bag is fixed to the body of the vehicle, a press member is operated and directly comes in contact with the restriction means, so the restriction means is surely detected from the acceleration sensor making the acceleration sensor operational.

If a screw is used as the press member, an operator can press and rotate the restriction means only by adding rotation force to the screw. The restriction means may directly interfere with a locus of movement of a inertial mass of the acceleration sensor, but on the other hand, if the movement of the inertial mass is transmitted to a firing pin through a drive shaft, the restriction means can be structured so as to be in contact with the drive shaft and to prevent the drive shaft from moving. In this case, the plane of movement of the drive shaft and the plane of rotation of the restriction means is disposed so as to be at right angles to each other.

DESCRIPTION OF THE PREFERRED EMBODIMENT

FIGS. 1 through 5 show a first embodiment of an air bag device of the present invention.

Figure 5:
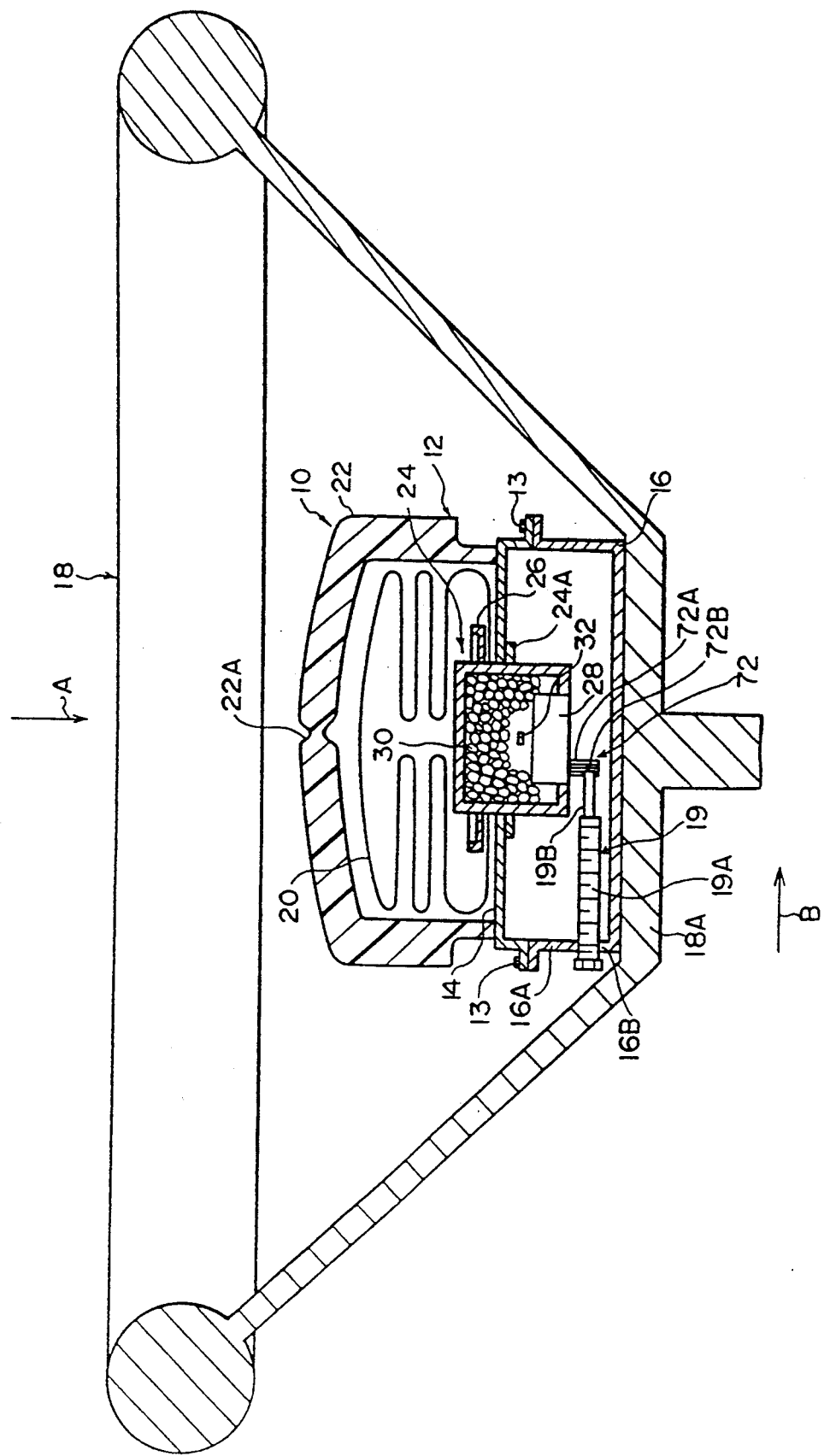
FIG. 5 is a partial sectional view of the air bag device of the first embodiment when attached to a steering wheel.

FIG. 5 is a partial sectional view of the first embodiment where an air bag device 10 is attached to a steering wheel 18. An arrow A in FIG. 5 shows the direction in which the air bag device 10 is attached to the steering wheel 18.

An air bag device body 12 of the air bag device 10 is attached to the steering wheel 18 by fixing it with bolts 13, or the like to a base plate 14 of the air bag device body 12 that is in turn fixed to a support plate 16. The support plate 16 is fixed to a hub portion 18A of the steering wheel 18.

A tapped hole 16B is formed on the side surface 16A of the support plate 16. A long bolt 19 is screwed into the tapped hole 16B toward a bag activation device 28 (described hereinafter) orthogonally to the attaching direction of the air bag device 10 (in the direction shown by an arrow B of FIG. 5).

The long bolt 19 is lengthy and is divided into a screw portion 19A of a large diameter and a tip portion 19B of a small diameter.

An air bag 20, an air bag cover 22, and an inflator 24 are respectively attached to the base plate 14.

The air bag 20 is disposed in a folded state on the base plate 14 (the upper portion in FIG. 5) on the side facing the occupant. The edge of the opening of the air bag 20 is attached substantially in the center of the base plate 14 via a ring plate 26. The ring plate 26 is screwed to the base plate 14 with bolts (not shown) and presses the base plate 14 against the edge of the opening of the air bag 20.

The air bag cover 22 is disposed on the occupant side of the base plate 14. The air bag 20 is accommodated between by the air bag cover 22 and the base plate 14. A frame-like core bar (not shown) is required in the air bag cover 22 along its edge. The air bag cover 22 is attached to the base plate 14 through the core bar by rivets or the like.

A thin portion 22A is formed in the air bag cover 22 at its corresponding portion to the base plate 14, so that the air bag cover 22 may be easily broken at the thin portion 22A.

The form of the inflator 24 is cylinder-like. The inflator 24 is disposed with a portion penetrating through a round hole in the center of the base plate 14 and inserted in the air bag 20. The inflator 24 is fixed at the side of the base plate 14 opposite to the occupant by a flange portion 24A. (the lower portion in FIG. 5) Sealed inside the inflator 24 is a gas generating material 30 which is combusted by the air bag activation device 28.

The gas generating material 30, by burning through combustion thereby produces a large amount of gas, which inflates the air bag 20. An example of this type of gas generating material is one which contains sodium azide.

A percussion cap 32 is disposed outside the air bag activation device 28. When the percussion cap 32 ignites an ignitor (not shown) ignites and thereby combusts the gas generating material 30.

Figure 1:
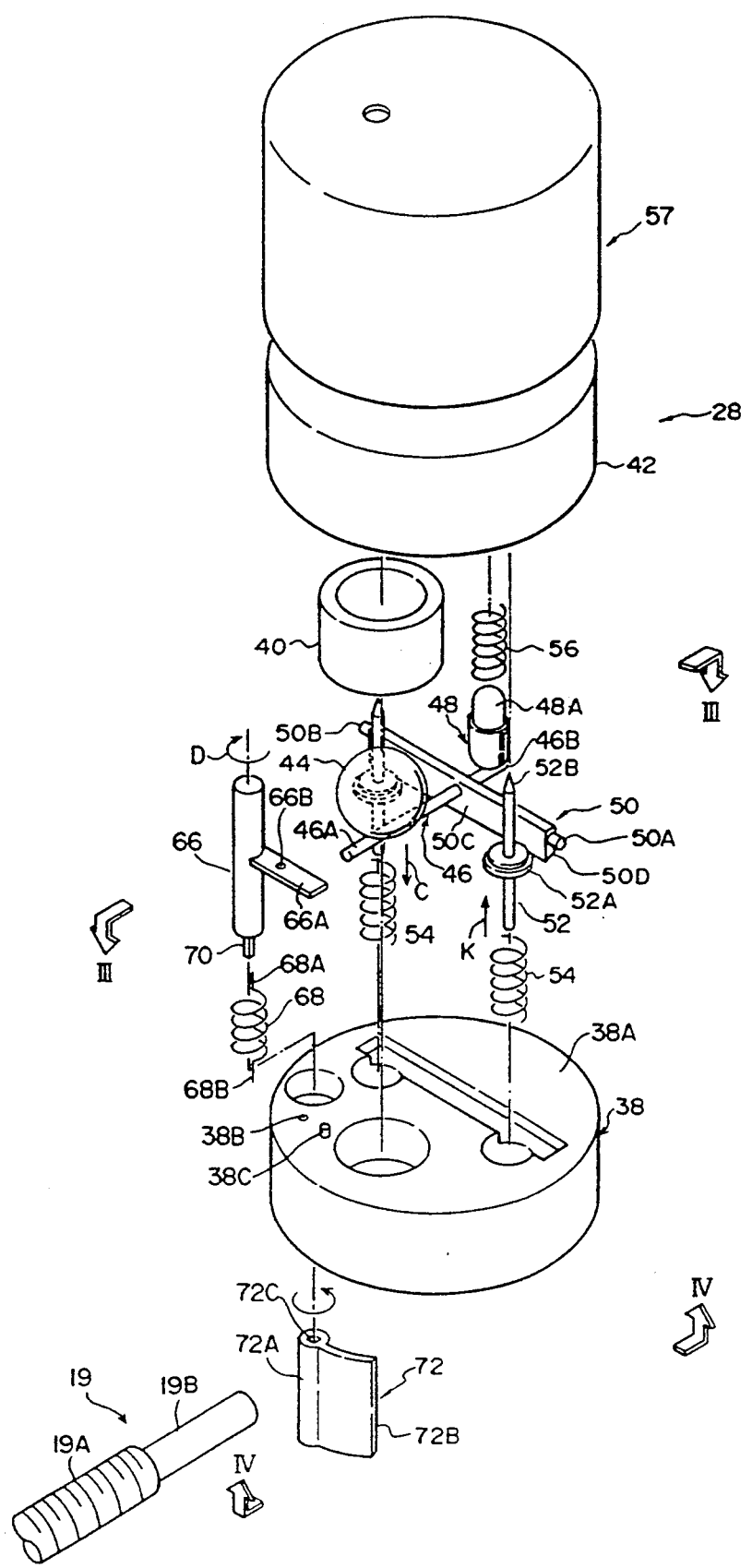
FIG. 1 is an exploded perspective view of an air bag activation device of a first embodiment of an air bag safety device of the present invention.
Figure 2:
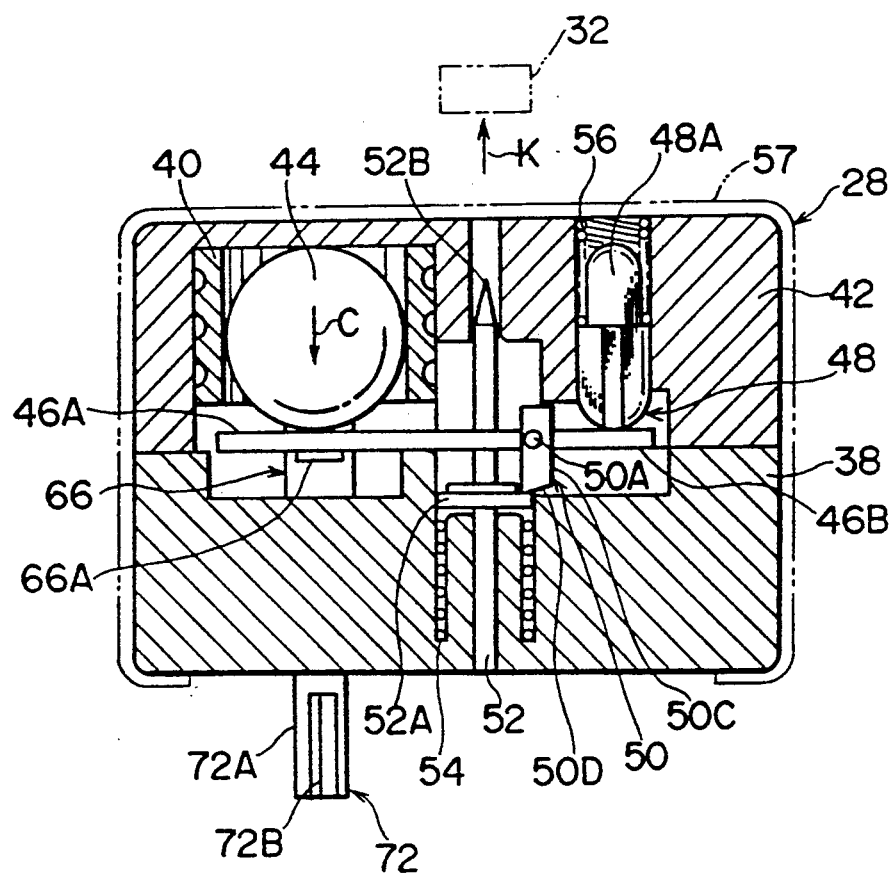
FIG. 2 is a sectional view taken along the line II—II of FIG. 3.
Figure 3:
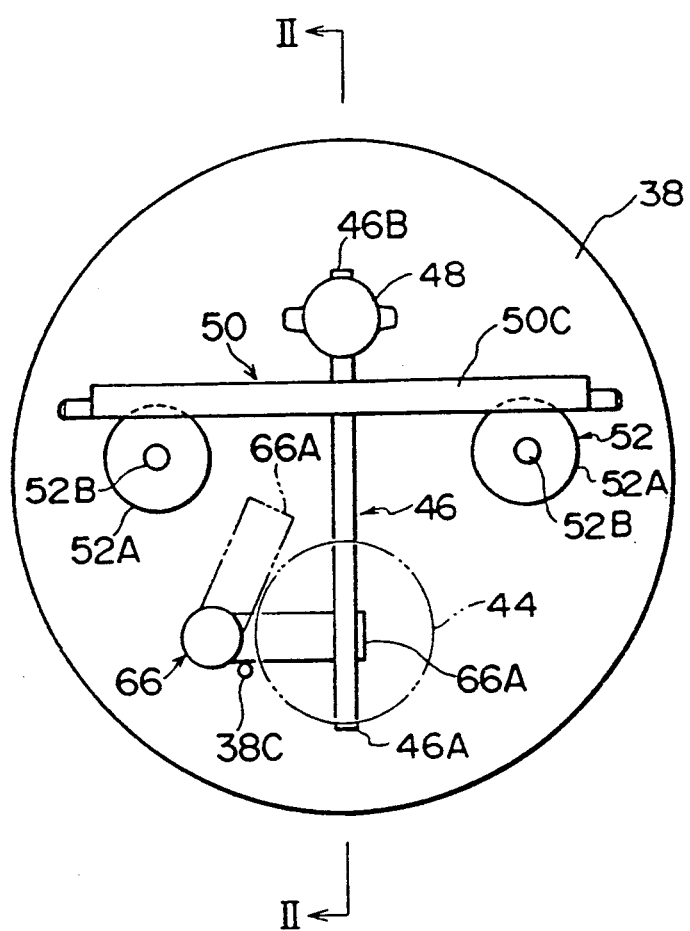
FIG. 3 is a fragmentary plan view taken in the direction of the arrows along the line III—III of FIG. 1.

As shown in FIG. 1, the air bag activation device 28 is cylinder-shaped and is divided into a lower case 38 and an upper case 42 by a plane orthogonal in relation to the axis. The plane includes a portion around the center of the axis. The lower case 38 and the upper case 42 are accommodated in a cylinder-like outer case 57 (FIG. 2). One ball 44 as an inertial mass in a mechanical ignition style air bag sensor is disposed in the upper case 42.

The ball 44 is inserted into a cylinder 40. The cylinder 40 is fixed in the upper case 42 so that the axis of the cylinder 40 may be parallel with the axis of the upper case 42. Accordingly, if a rapid acceleration acts on the ball 44, the ball 44 is arranged to move within the cylinder 40 toward the lower case (in the direction shown by an arrow C of FIG. 1). An end portion of the ball 44 on the side of the lower case 38 is in contact with one end portion 46A of a drive shaft 46. The drive shaft 46 is disposed along the boundary surface of the lower case 38 and the upper case 42 and is movable through the movement of the ball 44. The other end portion 46B of the drive shaft 46 is in contact with an end portion of a retainer 48 at its lower case side 38. The retainer 48 is disposed in the direction of the axis of the upper case 42.

A half of the retainer 48 on the side of the air bag 20 (the upper half in FIG. 1) is a small-diameter portion 48A. A compression coil spring 56 is fitted around the small-diameter portion 48A. An end portion of the compression coil spring 56 on the side of the air bag 20 is in contact with the outer case 57 which holds the lower case 38 and the upper case 42 (See FIG. 2).

Accordingly, the compression coil spring 56 urges the end portion 46A of the drive shaft 46 toward the ball 44 through the retainer 48.

A support shaft 50 is fixed to a longitudinal center portion of the drive shaft 46. The support shaft 50 is orthogonal in relation to the direction of the axis of the drive shaft 46.

As shown in FIG. 1, a rectangular hook portion 50C is formed at the center of the support shaft 50. Support portions 50A and 50B are protrudingly disposed at each longitudinal end portion of the hook portion 50C, respectively. The support portions 50A and 50B of the support shaft 50 are axially supported to the lower case 38 and the upper case 42 so as to be movable. The drive shaft 46 is rotatable with the support shaft being the center of rotation.

As shown in FIG. 2, an end surface 50D of the hook portion 50C of the support shaft 50 on the side opposite to the upper case 42 is fixedly engaged with a flange portion 52A of an ignition pin 52. The ignition pin 52 is disposed in the axial direction of the lower case 38. A compression coil spring 54 is disposed at the flange portion 52A of the ignition pin 52 on the side opposite to the hook portion 50C inside the lower case 38. The compression coil spring 54 urges the ignition pin 52 in the direction of the upper case 42 (in the direction of an arrow K of FIG. 2).

Accordingly, if the end surface 50D of the hook portion 50C of the support shaft 50 and the flange portion 52A of the ignition pin 52 detach through the rotation of the drive shaft 46; a pointed end portion 52B of the ignition pin 52 collides with the percussion cap 32 due to the urging force of the compression coil spring 54. By this, the percussion cap 32 ignites, the ignitor (not shown) ignites, the gas generating material 30 burns, and the air bag 20 is inflated.

As shown in FIG. 1, a lock shaft 66 is disposed in the lower case 38 and the upper case 42 so that its axis is parallel with the axes of the lower case 38 and the upper case 42. The lock shaft 66 is one of the members comprising an inertial mass movement blocking means. The lock shaft 66 is supported so as to be rotatable in the axial direction. In the longitudinal center of the lock shaft 66, an arm portion 66A functioning as a restriction portion is protrudingly disposed orthogonally with respect to the direction of the axis of the lock shaft 66. As shown in FIG. 1, the arm portion 66A is substantially rectangular and is disposed on the side of the end portion 46A of the drive shaft 46 that is opposite to the ball 44. Accordingly, as shown by a solid line in FIG. 3, when the arm portion 66A is located on the locus of rotation of the end portion 46A of the drive shaft 46, the arm portion 66A prevents the drive shaft 46 from rotating, while as shown by an imaginary line of FIG. 3, when the arm portion 66A withdraws from the locus of rotation of the end portion 46A of the drive shaft 46, the arm portion 66A permits the drive shaft 46 to rotate.

As shown in FIG. 1, a through hole 66B is formed in the arm portion 66A. An end portion 68A of a torsion coil spring 68 which is coiled around the portion of the lock shaft 66 that is on the side of the lower case 38 with respect to the arm portion 66A, is inserted into the through hole 66B. The other end portion 68B of the torsion coil spring 68 is inserted in a hole 38B formed on the surface 38A of the lower case 38 faceing the upper case. By this, the torsion coil spring 68 rotationally urges the lock shaft 66 in the clockwise direction as seen in FIG. 1 (in the direction of an arrow D of FIG. 1) and positions the arm portion 66A of the lock shaft 66 on the locus of rotation of the drive shaft 46. A protrusion 38C is formed on the surface 38A corresponding to the upper case 42 and serves to restrict the maximum clockwise rotation angle of the arm portion 66A as seen in FIG. 1 (in the direction of the arrow D in FIG. 1) and as illustrated by the solid line in FIG. 3.

The portion of the lock shaft 66 on the side of the upper case 42 is inserted into a groove (not shown) formed in the upper case 42. A square-pole-like portion 70 is formed in the lock shaft 66 on the side of the lower case 38. The square-pole-like portion 70 is inserted into a lever 72 thereby connecting it with the lock shaft 66. The lever 72 functions as a part of the inertial mass movement blocking means. The lever 72 is comprised of a shaft portion 72A and a bolt contact portion 72B formed in an arc. A square-pole-like hole 72C is axially formed in the shaft portion 72A, and the lock shaft 66 and the lever 72 operate integrally by inserting the angular portion 70 into the hole 72C. Accordingly, when the tip portion 19B of the long bolt 19 comes in contact with the bolt contact portion 72B and the lever 72 rotates counterclockwise as seen in FIG. 1 (in the opposite direction to that shown by the arrow D in FIG. 1), the lock shaft 66 also rotates counterclockwise (in the opposite direction to that shown by the arrow D of FIG. 1) against the urging force of the torsion coil spring 68. Therefore, the arm portion 66A also rotates counterclockwise as seen in FIG. 1 via the lock shaft 66.

Accordingly, by the rotation of the arm portion 66A, the arm portion 66A withdraws from the locus of rotation of the drive shaft 46, which makes the ball 44 movable.

Next, the operation of the first embodiment will be described.

When the air bag device body 12 is fixed to the steering wheel 18, an operator puts the base plate 14 on the support plate 16 from the attaching direction (the direction shown by an arrow A of FIG. 5). Then, via bolts 13, the base plate 14 is fixed to the support plate 16. Thus, the air bag device body 12 is fixed to the steering wheel 18.

Figure 4:
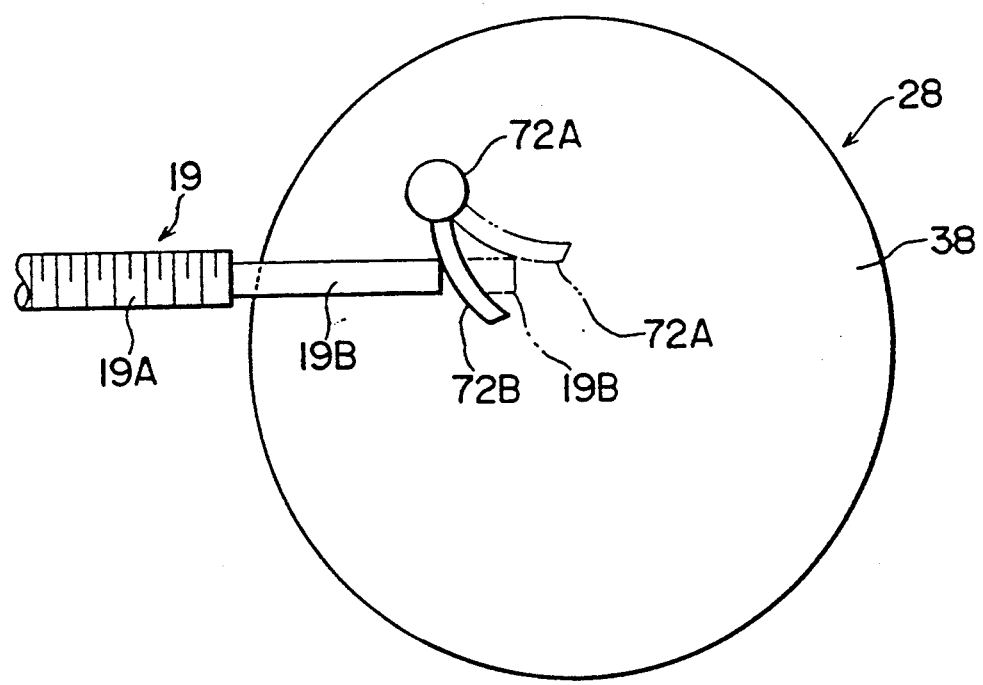
FIG. 4 is a fragmentary view taken in the direction of the arrows along the line IV—IV of FIG. 1.

Next, when the long bolt 19 is screwed orthogonally in relation to the attaching direction of the air bag device 10 (in the direction shown by an arrow B of FIG. 5), the tip portion 19B of the long bolt 19 comes in contact with the bolt contact portion 72B of the lever 72 (the state shown by the solid lines in FIG. 4) causing the lever 72 to rotate counterclockwise (in the opposite direction to that shown by the arrow D of FIG. 1) in the state shown by the phantom lines in FIG. 4. With the rotation of the lever 72, the lock shaft 66 integrally connected with the lever 72 also rotates counterclockwise (in the opposite direction to that shown by the arrow D of FIG. 1) against the urging rotational force of the torsion coil spring 68. By this, the arm portion 66A of the lock shaft 66 withdraws from the locus of movement of the drive shaft 46. Accordingly, in the present embodiment, only by the operation of screwing the long bolt 19 in, the lock shaft 66 serving as the inertial mass movement blocking means directly rotates around its axis and makes the ball 44 movable. Therefore, it is not necessary to machine the lock shaft 66 and the lever 72 with high-precision.

By the above operation, the attaching operation of the air bag device to the steering wheel is completed.

In the case of a rapid deceleration of a vehicle to which the air bag device 10 is attached, the ball 44 moves in the direction of the lower case 38 (in the direction shown by the arrow C) due to inertial force and the ball 44 presses the end portion 46A of the drive shaft 46.

Then, the drive shaft 46 rotates around the support shaft 50.

By this, the end surface 50D of the hook portion 50C of the support shaft 50 and the flange portion 52A of the ignition pin 52 detach. By the urging force of the compression coil spring 54, the ignition pin 52 moves toward the percussion cap 32. After the ignition pin 52 collides with the percussion cap 32, the gas generating material 30 combusts and the air bag 20 is inflated. A person in the vehicle is thus protected by the air bag 20.

When the air bag device 10 is removed from the steering wheel 18, the long bolt 19 is loosened and is moved in the pulling-out direction (in the direction opposite to that shown by the arrow B of FIG. 5). Next, as the tip portion 19B of the long bolt 19 and the bolt contact portion 72B of the lever 72 come apart, the lock shaft 66 rotates clockwise (in the direction shown by the arrow D in FIG. 1) due to the rotational urging force of the torsion coil spring 68. Then, the arm portion 66A of the lock shaft 66 is located on the locus of rotation of the drive shaft 46 and stops by coming in contact with the protruding portion 38c. The movement of the ball 44 is thereby, prevented.

Accordingly, even if an impact is imparted by mistake during the removing operation of the air bag device 10, the air bag 20 is not inflated.

In the present invention, when the long bolt 19 is screwed in, the long bolt 19 directly rotates the lock shaft 66 around its axis which causes the arm portion 66A to move from the locus of rotation of the end portion 46A of the drive shaft 46. As the construction is thus simple, the ball 44 can be made movable without fail if the long bolt 19 is screwed in.

Further, in the present invention, as only one ball 44 is disposed, the air bag device body 12 can be made smaller and its weight can be lightened.

SECOND EMBODIMENT

Figure 6:
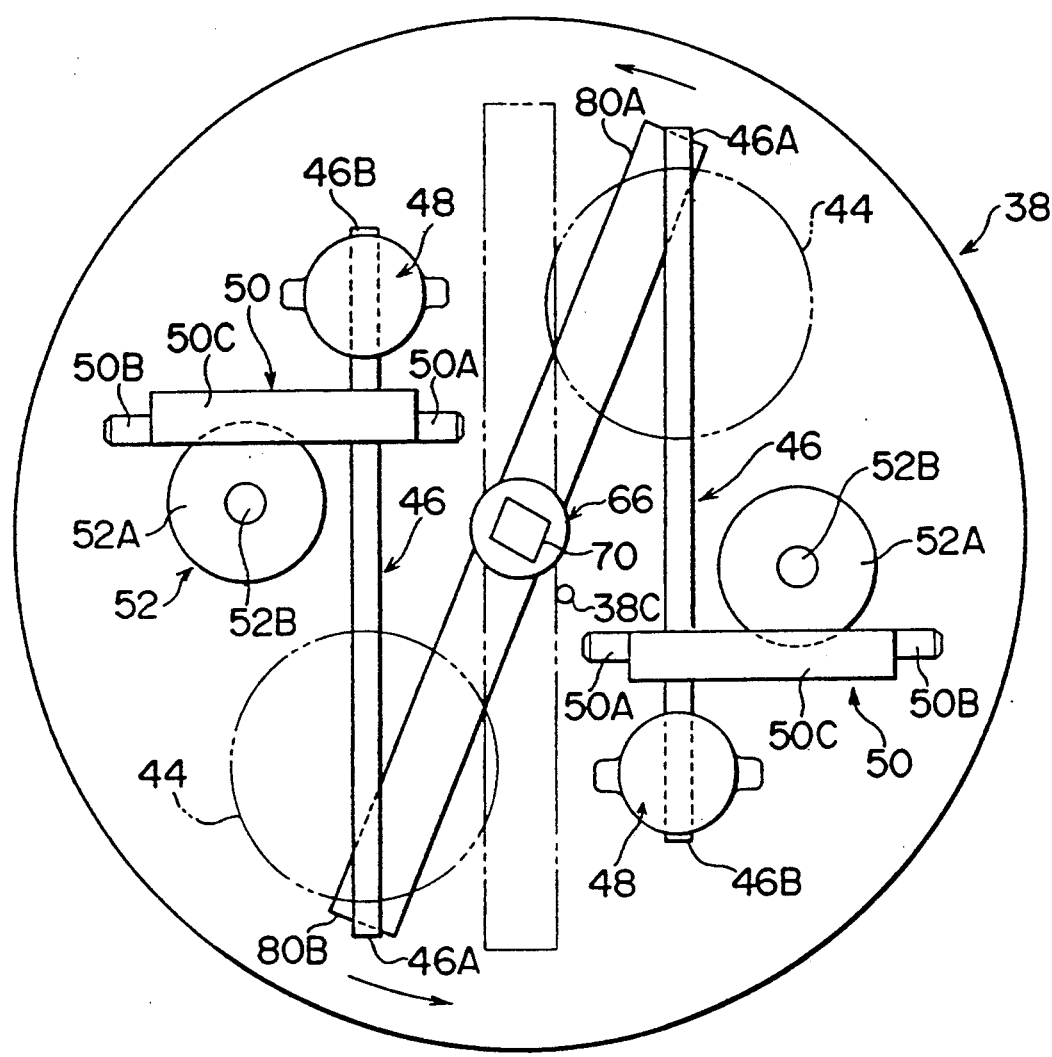
FIG. 6 is a plan view of a second embodiment of an air bag safety device of the present invention, the view corresponding to FIG. 3.
Figure 7:
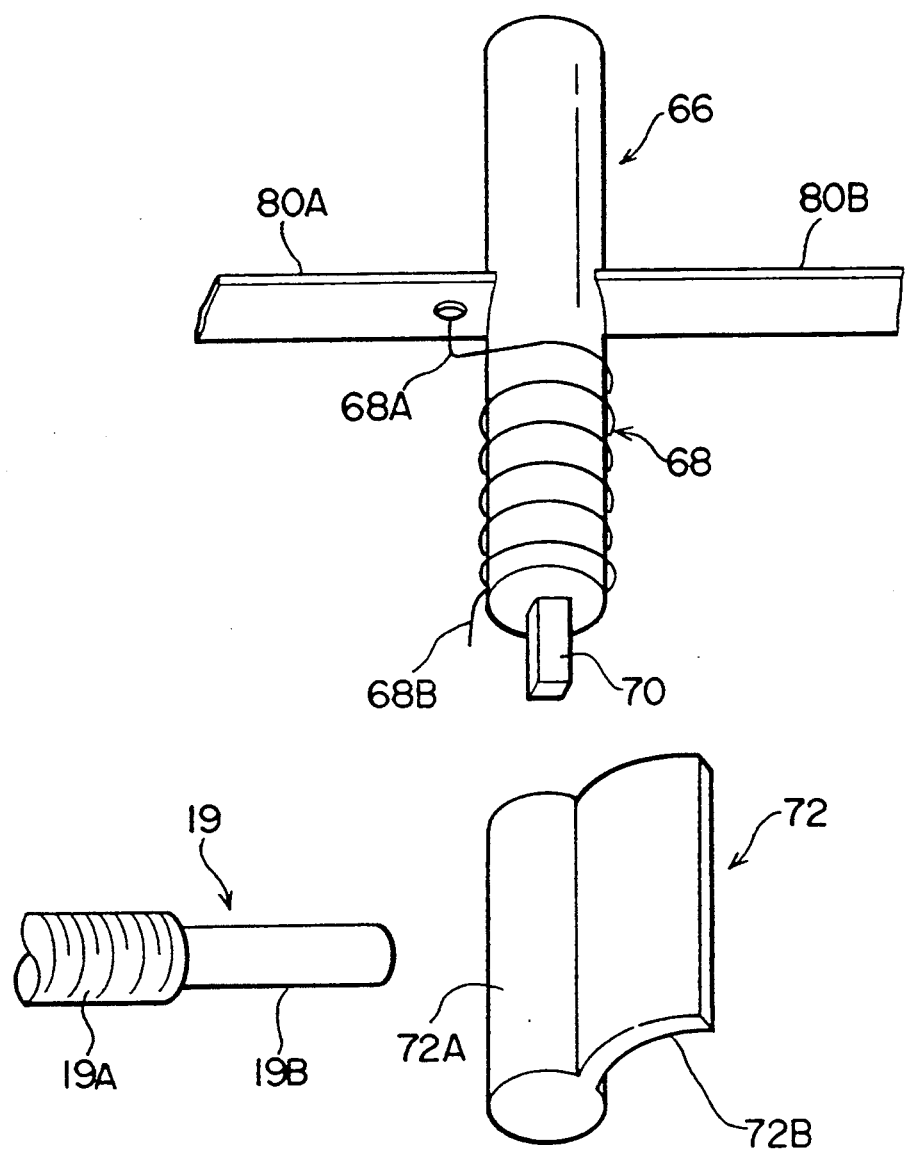
FIG. 7 is a complete perspective view of a lock shaft and a lever portion of the second embodiment.

FIGS. 6 and 7 show a second embodiment of an air bag device of the present invention.

As shown in FIG. 6, two balls 44 and, corresponding with the number of the balls 44, two drive shafts 46 are disposed in an air bag activation device 28 of the present embodiment. The balls 44 and the drive shafts 46 are symmetrically disposed. A lock shaft 66 is disposed between the balls 44 with its axis rotatably supported.

As shown in FIG. 7, an arm portion 80A and an arm portion 80B are protrudingly disposed on opposite sides from each other in relation to the lock shaft 66.

Accordingly, as shown in FIG. 6, the arm portion 80A and the arm portion 80B are located on the loci of rotation of the two drive shafts 46, respectively. The arm portions 80A and 80B prevent the balls 44 from moving via end portions 46A of the drive shafts 46.

As shown in FIG. 7, when a long bolt 19 is screwed in, a tip portion 19B of the long bolt 19 comes in contact with a bolt contact portion 72B of a lever 72, and the lever 72 is rotated. The lock shaft 66 also rotates around its axis. Then, as shown by phantom lines in FIG. 6, the arm portions 80A and 80B rotate counterclockwise (in the direction of arrows of FIG. 6). By this, the arm portions 80A and 80B withdraw from the loci of rotation of the drive shafts 46 and move to locations shown by the imaginary lines. The balls 44 thus become movable.

THIRD EMBODIMENT

Figure 8:
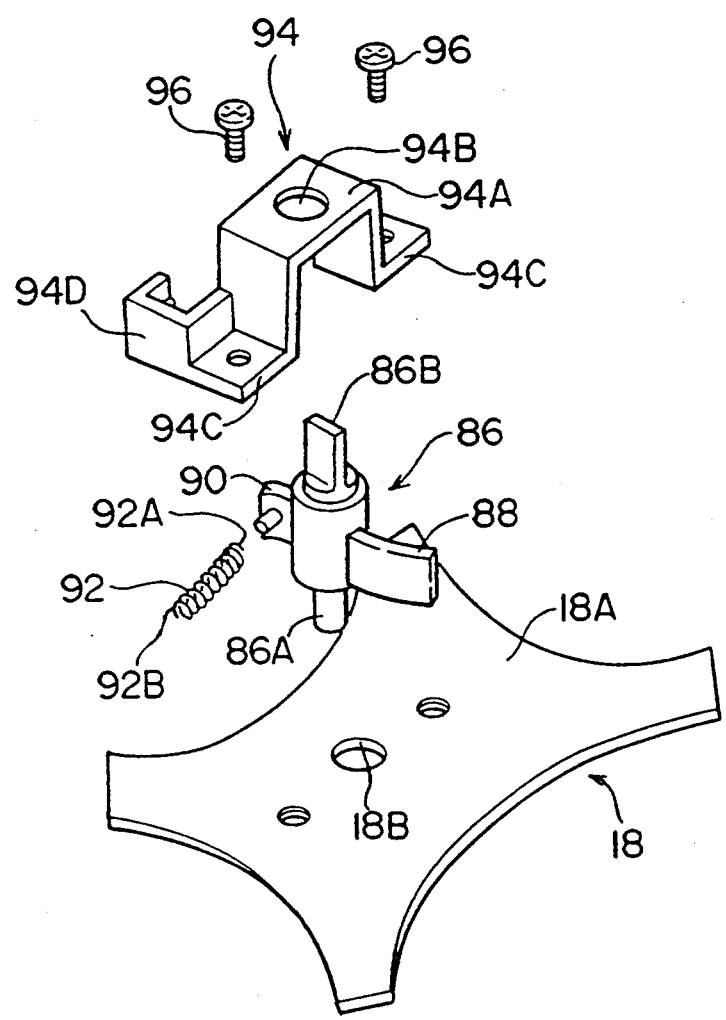
FIG. 8 is an exploded perspective view of a lever and a bracket of a third embodiment of an air bag safety device of the present invention.
Figure 9:
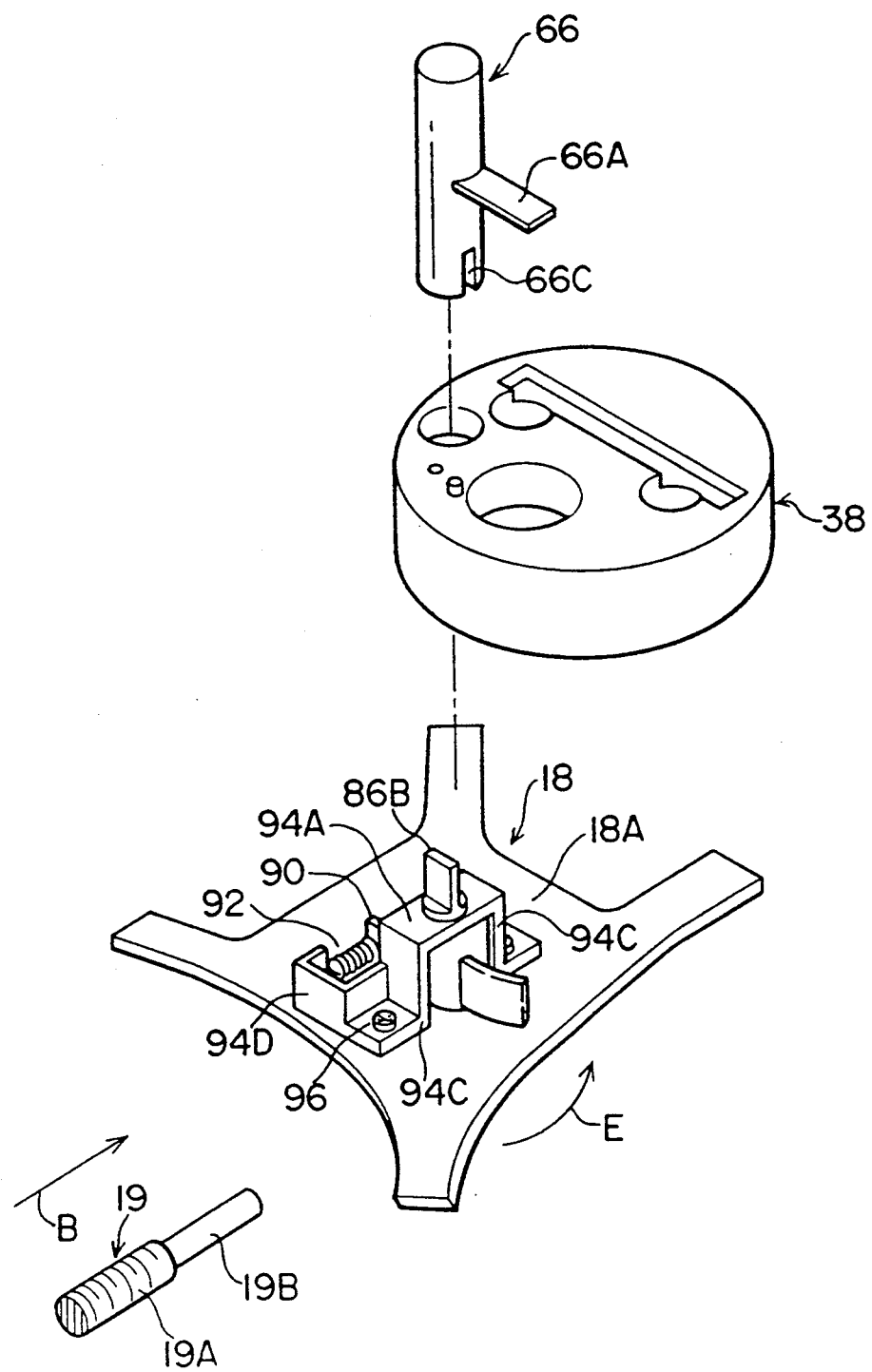
FIG. 9 is a perspective view with the lever of FIG. 8 attached to a steering wheel.
Figure 10:
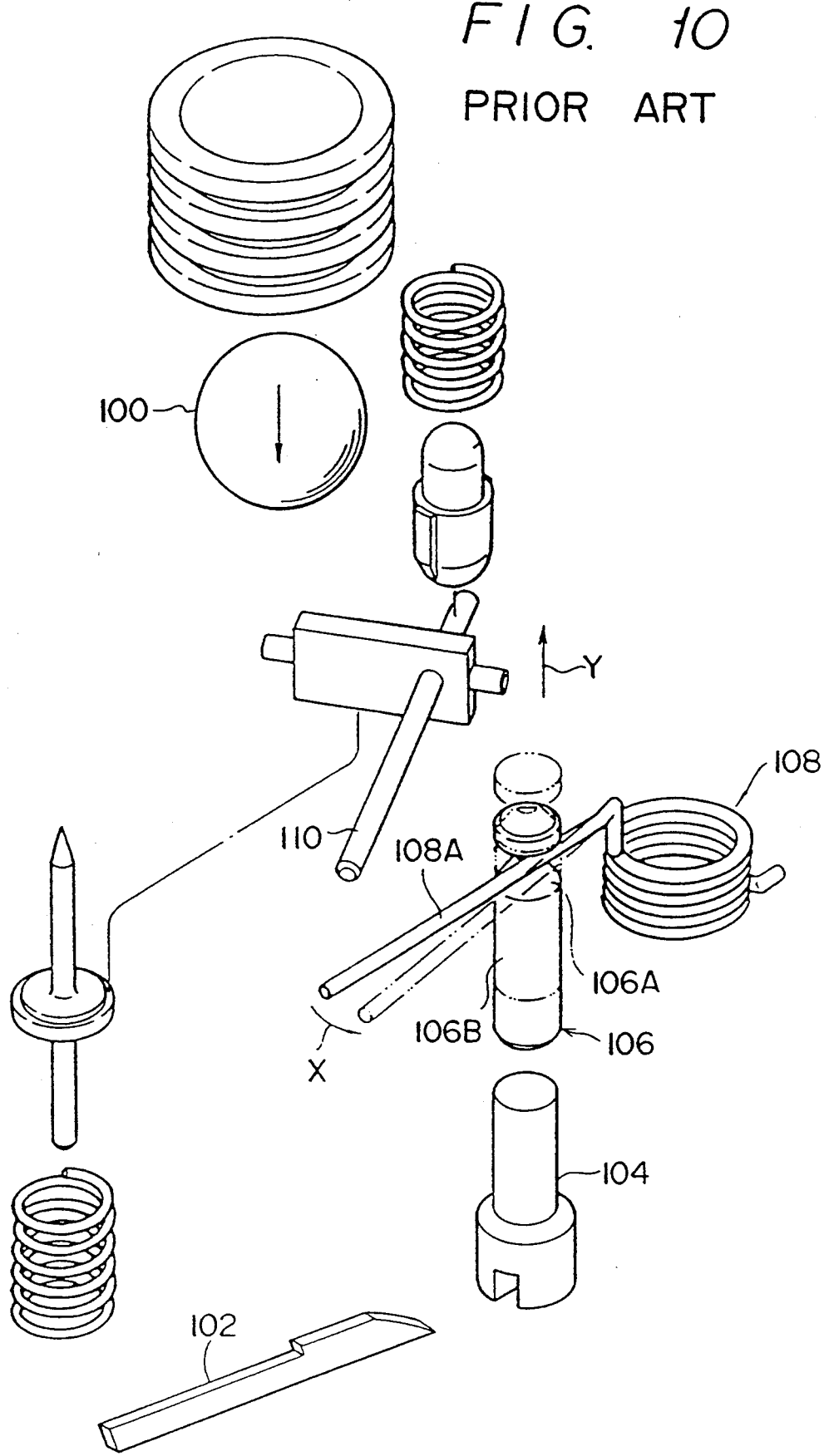
FIG. 10 is a partial exploded perspective view of a conventional air bag safety device.

FIGS. 8 and 9 show a third embodiment of an air bag device of the present invention.

As shown in FIG. 8, a round hole 18B is formed in a hub portion 18A of a steering wheel 18. By inserting one end portion 86A of a lever 86 in the round hole 18B, the lever 86 is rotatably disposed on the hub portion 18A of the steering wheel 18 in a standing state. A bolt contact portion 88 and a tongue piece 90 are protrudingly disposed at the center portion of the lever 86 in a crossing direction with respect to the direction of the axis of the lever 86. A return spring 92 is supported by the tongue piece 90 and one end 92A of the return spring 92 is in contact with the tongue piece 90.

A bracket 94 is disposed above the lever 86 in which a side view of the bracket 94 is hat-like. The bracket 94 is fixed to the hub portion 18A of the steering wheel 18 by screws 96. In the middle portion of the bracket 94 a round hole 94B is formed in a top plate portion 94A. The other end portion 86B which is formed like a plate of the lever 86 penetrates the round hole 94B.

The return spring 92 is disposed between the bolt contact portion 88 of the lever 86 and an upright surface 94D formed on one leg portion 94C of the bracket 94. The other end portion 92B of the return spring 92 is in contact with the upright surface 94D.

As shown in FIG. 9, an axial groove 66C is formed in a lock shaft 66. By the engagement of the groove 66C with the other end portion 86B of the lever 86, the lever 86 and the lock shaft are integrally formed. Accordingly, when a tip portion 19B of the long bolt 19 comes in contact with a bolt contact portion 88 of the lever 86 and the lever 86 rotates in the direction shown by an arrow E, an arm portion 66A of the lock shaft 66 also rotates and withdraws from the locus of rotation of the drive shaft 46.

When the long bolt 19 is loosened and is moved in the pull-out direction, the tip portion 19B of the long bolt 19 and the bolt contact portion 88 of the lever 86 detach, and at that time, the return spring 92 urges the lever 86 via the tongue piece 90 in the opposite direction to that shown by the arrow E in FIG. 9. Thus, the lock shaft 66 also rotates in the direction opposite to that shown by the arrow E in FIG. 9. Therefore, the arm portion 66A of the lock shaft 66 returns to the locus of rotation of the drive shaft 46 and comes in contact with the end portion 46A.

In the present embodiment, the lever 86 is in advance fixed to the hub portion 18A of the steering wheel 18. Before the air bag device body 12 is fixed to the steering wheel 18, the lock shaft 66 and the lever 86 can not be connected with each other. Accordingly, the lock shaft 66 does not rotate and, therefore, the present embodiment has an advantage in that the air bag 20 can be prevented from inflating when the air bag device is carried, etc.

What is claimed is:

1. An air bag device for inflating an air bag when an acceleration is detected above a predetermined level comprising:
    (a) an acceleration sensor having an inertial mass;
    (b) a drive shaft contacting said acceleration sensor;
    (c) restriction means for preventing said acceleration sensor from operating, said restriction means being axially rotatable between a first rotation position for immobilizing said drive shaft by contacting said drive shaft even when acted upon by said interial mass, and a second rotation position for enabling rotation of said drive shaft, so as to render said acceleration sensor operational; and
    (d) a press member which directly comes in contact with said restriction means and rotates said restriction means from said first rotation position to said second rotation position by being pushed in, whereby said acceleration sensor is made operational without fail.

2. An air bag device according to claim 1, further comprising an urging means for urging said restriction means in the direction of said first rotation position to lock said acceleration sensor.

3. An air bag device according to claim 1, wherein said air bag device includes a pin such that when said restriction means is positioned in said second rotation position, said acceleration sensor is rendered operational by means of said drive shaft releasing said pin of said air bag device from a movement restricted state, so that said pin is capable of colliding with a percussion cap when an inertial force acts on said acceleration sensor.

4. An air bag device according to claim 1, wherein said inertial mass lies on one side of said drive shaft and said restriction means lies on an opposite side thereof.

5. An air bag device according to claim 1, wherein said restriction means is comprised of a lock shaft and an arm extended from said lock shaft and said inertial mass includes a locus of movement of a center of gravity of said inertial mass, wherein a contact portion between said arm of said restriction means and said drive shaft is positioned on the locus of movement of the center of gravity of said inertial mass.

6. An air bag device according to claim 1, wherein a pair of said inertial masses and a pair of drive shafts each of which corresponds to each of said inertial masses are disposed and a center of rotation of said restriction means is disposed between said pair of drive shafts so that arms of said restriction means protruding in the opposite directions from each other may engage with said drive shaft, respectively.

7. An air bag device according to claim 1, wherein said restriction means has a first plane including a locus of rotation of one contact portion where said restriction means contacts said drive shaft, and said drive shaft has a second plane including a locus of movement of a second contact portion where said drive shaft contacts said restriction means, wherein said first and second planes are generally at right angles to each other.

8. An air bag device according to claim 1, wherein said press member rotates said restriction means by coming in contact with a radially protruding arm of said restriction means.

9. An air bag apparatus according to claim 1, wherein said press member axially moves and rotates said restriction means in the direction of said second rotation position to release said acceleration sensor.

10. An air bag device wherein an air bag inflates and comes in contact with an occupant during rapid deceleration of a vehicle comprising:
    (a) an air bag body to be attached to a vehicle body;
    (b) inflating means accommodated in said air bag body having an explosive mixture to inflate said air bag;
    (c) an acceleration sensor accommodated in said air bag body to activate said explosive mixture of said inflating means, said acceleration sensor including a drive shaft driven by an inertial mass, said explosive mixture being activated by rotation of said drive shaft;

(d) restriction means being engaged with said drive shaft of said acceleration sensor to prevent said acceleration sensor from being activated; and (e) a screw press member which, by being screwed in after said air bag body is fixed to said vehicle body, comes in contact with said restriction means, rotates said restriction means to a position not corresponding to the position of said acceleration sensor, makes said acceleration sensor movable, and rotates without fail said restriction means by directly coming in contact with said restriction means.

11. An air bag device according to claim 10, wherein said restriction means includes a protruding arm which prevents said drive shaft and said inertial mass from moving by coming in contact with a portion of said drive shaft wherein said protruding arm contacts said drive shaft on one side of said drive shaft and said inertial mass contacts said drive shaft on a side opposite thereof.

12. An air bag device according to claim 11 wherein said arm includes an axis of rotation and said drive shaft includes an axis of rotation wherein a plane including the axis of rotation of said arm and a plane including the axis of rotation of said drive shaft are substantially at right angles to each other.

13. An air bag device according to claim 10, wherein said acceleration sensor comprises a plurality of inertial masses, said restriction means having protruding arms corresponding to said inertial masses, respectively, to prevent said inertial masses from moving.

14. An air bag device according to claim 13, wherein said restriction means includes a center of rotation which is disposed among or between said plurality of inertial masses and said arms radially protrude respectively corresponding to said inertial masses.

15. An air bag device according to claim 10, further including an arm for coming in contact with said screw press member wherein said restriction means includes a center of rotation and said arm radially protrudes from said center of rotation of said restriction means.

16. An air bag device according to claim 15, wherein a contact portion with said screw press member of said arm protruding from said restriction means has a curved surface.

17. An air bag device which is attached substantially at a center portion of a steering wheel of a vehicle comprising:

(a) an air bag body;

(b) an air bag accommodated in said air bag body in a folded state;

(c) gas generatng means which inflates said air bag;

(d) a percussion cap which ignites said gas generating means;

(e) a firing pin which is urged in a colliding direction with said percussion cap;

(f) a support shaft which keeps said firing pin away from said percussion cap;

(g) a drive shaft for rotating said support shaft, said drive shaft being fixed to said support shaft.

(h) urging means for maintaining an engaging state of said support shaft with said firing pin by imparting an urging force to said drive shaft;

(i) an inertial mass which, when acceleration above a predetermined level acts on said inertial mass, moves and rotates said drive shaft, causing said support shaft to detach from said firing pin;

(j) a restriction means, which is rotatably supported by said air bag and which prevents said drive shaft from moving by coming in contact with a portion of said drive shaft on the side opposite to a contact portion of said drive shaft with said inertial mass and rotates to a portion where it does not correspond to said drive shaft; and (k) screw push-in means which is rotated by an assembly operator after said air bag is fixed to said steering wheel and which rotates and detaches said restriction means from said drive shaft.

18. An air bag device which inflates an air bag when an acceleration sensor therein detects acceleration above a predetermined level comprising:

(a) restriction means for preventing said acceleration sensor from moving, which is rotatable around its axis and prevents said acceleration sensor from moving at a first rotation position and makes said acceleration sensor movable at a second rotation position; and (b) a press member which directly comes in contact with said restriction means and rotates said restriction means from said first rotation position to said second rotation position by being pushed in, whereby said acceleration sensor is made operational without fail and wherein said restriction means includes a first and a second axis coaxially and relatively immovably connected with each other, an arm raidally protruding from said first axis capable of contacting said acceleration sensor, and an arm radially protruding from said second axis capable of contacting said press member.

19. An air bag device according to claim 18, wherein said first and second axes are coaxially connected with each other by fitting a protrusion whose section is not a circle protruding from one end of one of said axes into a hole formed at one end of the other of said axes.

* * * * *